United States Patent [19]
Graham

[11] Patent Number: 4,803,699
[45] Date of Patent: Feb. 7, 1989

[54] BUS APPARATUS WITH A PLURALITY OF TRANSMITTERS

[75] Inventor: Martin H. Graham, Berkeley, Calif.

[73] Assignee: Rolm Corporation, Santa Clara, Calif.

[21] Appl. No.: 899,431

[22] Filed: Oct. 23, 1986

Related U.S. Application Data

[63] Continuation of Ser. No. 613,025, May 22, 1984, abandoned.

[51] Int. Cl.$^4$ .................... H03K 19/03; H03K 19/94
[52] U.S. Cl. ........................ 375/36; 375/121; 307/270
[58] Field of Search .............. 375/36, 121; 370/24, 370/25, 85; 333/12; 307/270; 340/825.5, 825.74

[56] References Cited

U.S. PATENT DOCUMENTS

| | | | |
|---|---|---|---|
| 3,875,332 | 4/1975 | Fletcher et al. | 375/36 |
| 4,038,601 | 7/1977 | Laborie et al. | 375/36 |
| 4,388,725 | 6/1983 | Saito et al. | 375/36 |
| 4,398,298 | 8/1983 | Van Egmond et al. | 375/36 |
| 4,531,068 | 7/1985 | Kraft et al. | 307/270 |

Primary Examiner—Robert L. Griffin
Assistant Examiner—Stephen Chin
Attorney, Agent, or Firm—Blakely, Sokoloff, Taylor & Zafman

[57] ABSTRACT

An improvement in a bus where the propagation time between two of the transmitters on the bus is appreciable compared to the period of the bus cycles. High impedance drivers are used by the transmitters to permit signals on the bus to be superimposed on one another. This permits signals from one transmitter to be propagated even when that transmission occurs while another signal is propagating past that transmitter.

5 Claims, 2 Drawing Sheets

BUS APPARATUS WITH A PLURALITY OF TRANSMITTERS

This is a continuation of application Ser. No. 613,025 filed 5/22/84, now abandoned.

BACKGROUND OF THE INVENTION

1. Field of the Invention

The invention relates to the field of electrical buses particularly where a plurality of transmitters transmit onto a common bus.

2. Prior Art

Often, many transmitters and receivers are connected to a common electrical path or bus. Various control mechanisms are used to regulate transmission to prevent two transmitters from transmitting simultaneously. For instance, in Ethernet, collisions between signals are detected and retransmission occurs at random times. In other systems, a "token" is passed between the transmitters to enable one transmitter at a time. Arbitration circuits are used in still other systems to permit transmission to occur on a priority basis or in the order requested. Countless other mechanisms are used to prevent interference on a bus.

In investigating transmission difficulties over a common bus used on a computerized branch exchange, a peculiar bus interference was discovered which resulted in the present invention. This interference is of the type that resembles simultaneous transmission by two transmitters. However, in the branch exchange, the expanders which are equivalent of the transmitters, each have unique addresses, and address signals are transmitted from a common source preventing simultaneous transmission. The nature of this interference will be described in detail in conjunction with FIG. 1.

SUMMARY OF THE INVENTION

An improvement in an electrical bus where a plurality of transmitters are connected to the bus is described. The improvement comprises the use of transmitters which have a substantially higher impedance, both when transmitting and not transmitting than the characteristic impedance of the bus itself. For instance, where the bus has a 50 ohm characteristic impedance, the transmitters should have an impedance at least 10 times or greater the characteristic impedance of the bus or 500 ohms or greater. This cannot be achieved with ordinary TTL circuits and requires, for instance, the bus to be driven by a current source driver or the like. The improvement is useful where the propagation delay between transmitters along the bus is an appreciable portion of the period of transmissions (e.g., bus cycle period).

DETAILED DESCRIPTION OF THE INVENTION

An improved bus apparatus is described. In the following description, the problem solved by the present invention is described in conjunction with a computerized branch exchange (i.e., telephone switching system). This is done for purposes of convenience and since the problem was discovered on the branch exchange. The common bidirectional bus is used in many computer systems. It will be obvious to one skilled in the art, however, that the present invention may be practiced on other buses and in connection with different electrical systems.

Figure 1:
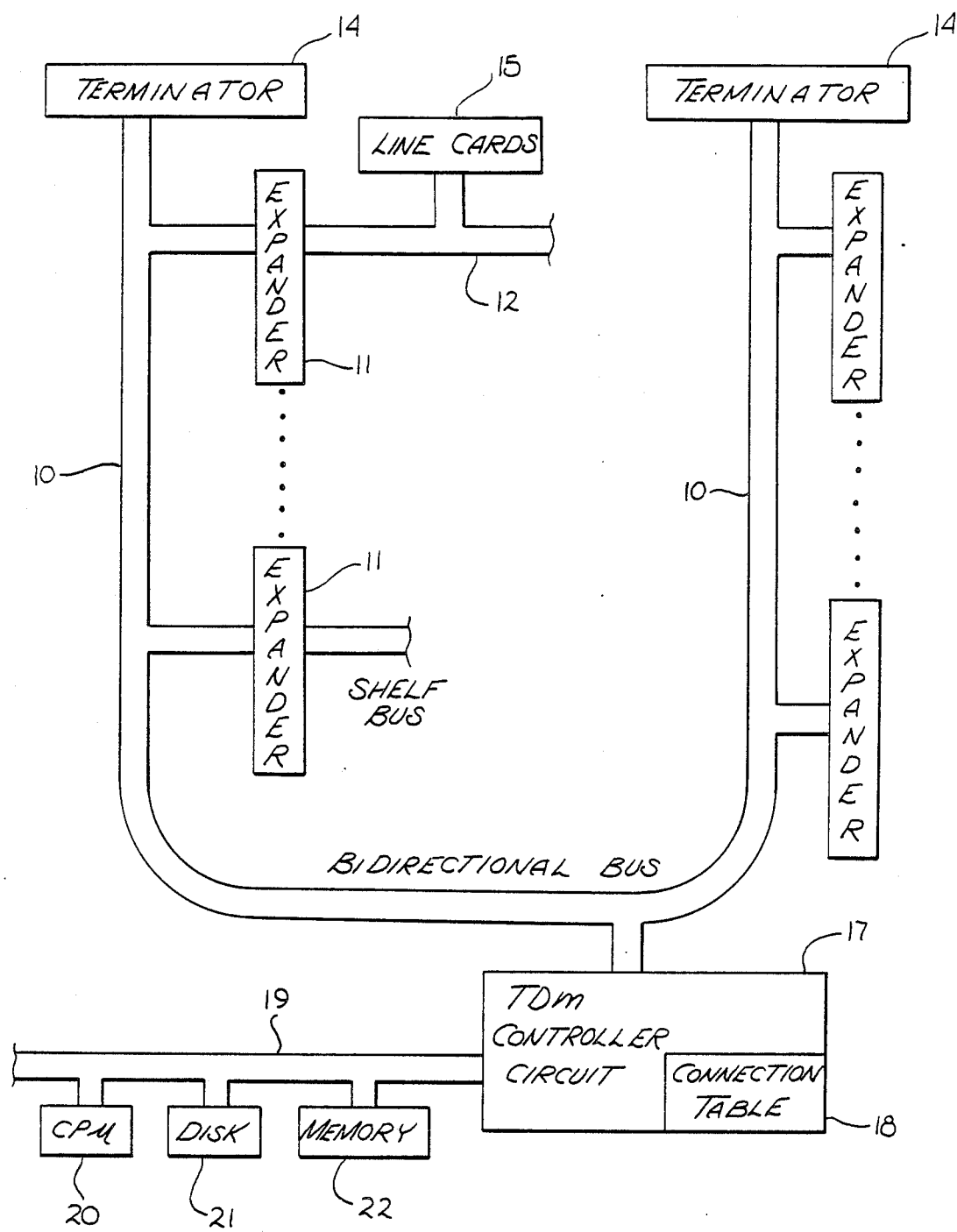
FIG. 1 is a block diagram of a prior art computerized branch exchange.

In the prior art branch exchange of FIG. 1, a time division multiplexed, bidirectional bus 10 interconnects a plurality of expanders 11 and also provides coupling to a time division multiplexed (TDM) controller circuit 17. In practice, the bus 10 is a long, flat, multiconductor flexible cable which interconnects the TDM controller circuit 17 and expanders located on shelves in one or more cabinets. Thus, the bus 10 is sometimes referred to as the intershelf bus (ISB). On each shelf, an expander 11 buffers the signals from the bus 10 and couples the signals to a shelf bus 12. This bus, in practice, is a "back plane" arrangement where the conductive paths are formed on a printed circuit board. A plurality of cards, such as the line card 15, plug into the shelf buses 12. These cards provide the interface to telephone station sets and commercial lines, and consequently, receive the "twisted pairs" or other lines used for the station sets, commercial lines or the like.

In the exchange of FIG. 1, address, data and control signals are time multiplexed on the bus 10 and then onto the buses This multiplexing occurs under the control of a central processing unit (CPU) 20. The CPU, disk drive 21, and memory 22, are coupled to a bidirectional computer bus 19 which interfaces with the bus 10 through the TDM controller circuit 17. The circuit 17 includes a connection table 18 (random-access memory) which stores the "to" and "from" addresses for each call being completed over the bus 10. That is, when a call is initiated the called and calling numbers are sensed by the CPU over the bus 10 and stored in appropriate locations in table 18. The table is scanned in each time frame to provide address signals, which after transmission onto the shelf buses, access the line cards.

The switching on the buses 10 and 12 is divided into frames and each frame is divided into time slots. In the commercially available exchange illustrated in FIG. 1, there are 384 time slots (or bus cycles) per frame. Each time slot is 216 nanoseconds long. Consequently, each connection made through the bus 10 is sampled at a rate of 12 kHz. This provides a theoretical bandwidth of 6 kHZ for each connection, however, in practice, to reduce the requirements of filtering, a bandwidth of approximately 3.5 kHz is employed.

In theory, with 384 time slots, up to 192 two-way conversations are possible through the exchange of FIG. 1. Some time slots are used to transfer signalling information from the shelf buses, thus reducing the total possible connections. Because the signalling information changes slowly when compared to the frame rate, relatively infrequent polling of line cards can occur (16 time slots are used for this purpose in the exchange of FIG. 1).

For purposes of the present invention, it should be known that each expander 11 has a unique address and in each time slot one expander is selected to transmit data onto bus 10 and another to receive data, thus only one transmitter is driving a given set of lines of the bus in each time slot.

An interference between signals was discovered on bus 10 which lead to the present invention. It was first learned that the interference occurred when transmissions in consecutive time slots took place from opposite ends of the bus 10. It was finally learned that the interference was caused by one transmitter transmitting into (or onto) a signal on the bus from a prior transmission. This degrades the performance if the propagation time from one end of the bus to the other is an appreciable part of the duration of the bus cycles. With the long bus 10 which may interconnect expanders in several cabinets, the propagation time between the ends of the cable is an appreciable part of the duration of a time slot.

More specifically, suppose a transmission occurs from one end of the bus and is intended to be received by an expander at the other end of the bus. If a subsequent tranmission occurs at this other end of the bus before the first transmission is received, a collision can occur on the bus and data may be lost. This is referred to as the "nibble effect". To prevent this, the prior art CPU is programmed to bar consecutive transmission between ends of the cable. This limitation hinders the full use of the time slots.

Figure 2:
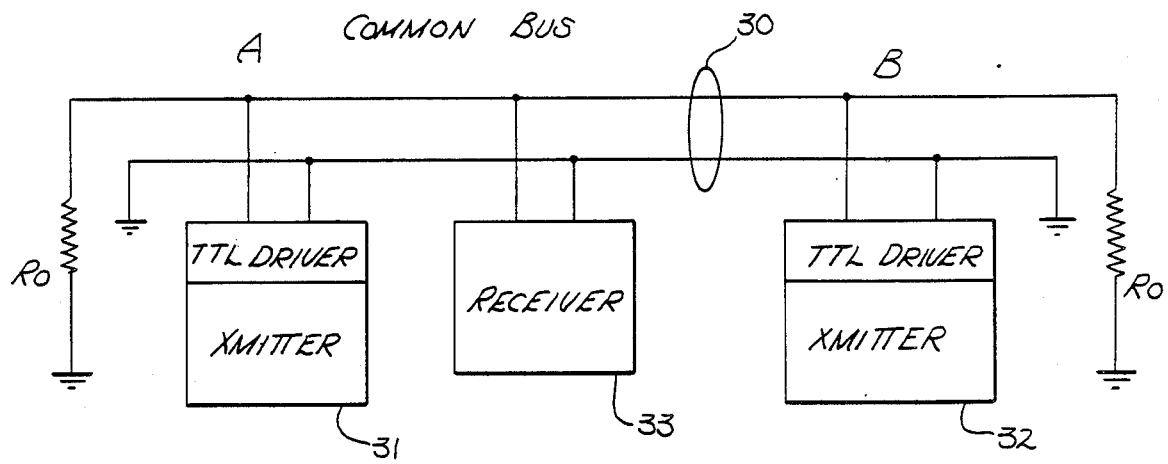
FIG. 2 illustrates a prior art bus where transmitters are coupled to the bus through TTL drivers.

Referring to FIG. 2, the nibble effect can be better understood from the following mathematical analysis. In FIG. 2, a bus 30 is shown which has a characteristic impedance $R_O$ and which is terminated at both ends in resistors $R_O$. Transmitter 31 is connected to the bus at one end "A" while transmitter 32 is connected at the bus at the other end "B". A receiver 33 is also shown connected to the bus. The impedance of bus 30 as seen by the transmitter and receiver is $R_O/2$. A current "i" injected into the bus at A will produce a voltage equal to $(i)(R_O/2)$ across the bus at A. This voltage will then propagate to the left and the right of A with a velocity V, the velocity of propagation along the bus.

At any point along the bus, the Thevenin equivalent circuit is the voltage across the bus due to the injected current at point A, in series with $R_O/2$, assuming that the only impedances connected across the bus are the terminators.

Transmitters connected to the bus, such as transmitters 31 and 32, having a transmission voltage $V_T$ and source impedance $R_T$, will inject a current "i" as follows:

$$i = \frac{V_T - V_{TH}}{R_T + \frac{R_O}{2}} \quad (1)$$

where $V_{TH}$ is the Thevenin equivalent voltage mentioned above.

Assume that transmitter 31 first transmits and that the Thevenin equivalent voltage on the line at the time of transmission is zero (e.g., no other signals on bus). Referring to equation 1 above, $V_{TH}$ is zero. The voltage on the bus at A "$V_A$" will be:

$$V_A = \frac{V_T}{R_T + \frac{R_O}{2}} \cdot \frac{R_O}{2} \quad (2)$$

If transmitter 32 transmits when the voltage represented by equation 2 is at B "$V_B$" (equation 2 then representing the Thevenin equivalent potential) $V_B$ would be equal to:

$$V_B = \frac{V_T - \left(\frac{V_T}{R_T + \frac{R_O}{2}}\right)\left(\frac{R_O}{2}\right)}{R_T + \frac{R_O}{2}} \cdot \frac{R_O}{2} \quad (3)$$

The ratio of $V_B$ to $V_A$ is $$\frac{V_B}{V_A} = \frac{R_T}{R_T + \frac{R_O}{2}} \quad (4)$$

It is apparent from equation 4 that if $R_T$ is equal to 0, the ratio of $V_B$ to $V_A$ is also equal to 0. Put another way, if transmission occurs from a low impedance driver, the transmission from transmitter 32 is lost. For the diagram of FIG. 2, if the signal from transmitter 31 has propagated to B when transmitter 32 transmits, a portion of the signal from transmitter 32 is lost, and will, for instance, not be sensed by receiver 33 if $R_T$ is zero or of lower value when compared to $R_O$. This is the case for the illustrated TTL drivers of FIG. 2 since these commonly used bus drivers are low impedance sources.

From equation 4 it is apparent that $V_B/V_A$ should be 1, and this implies that $R_T$ be equal to infinity or that $R_O/2$ be equal to 0. Since the characteristic impedance of the bus cannot equal 0, or $R_T$ cannot equal infinity $R_T$ must be made larger than $R_O$, for $V_B/V_B$ to approach one. Below in Table 1, various values for $R_T/R_O$ are shown with their corresponding value for $V_B/V_A$.

TABLE 1

| $\frac{R_T}{R_O}$ | $\frac{V_B}{V_A}$ |
|---|---|
| 0 | 0 |
| 1.0 | .667 |
| 2.0 | .800 |
| 5.0 | .909 |
| 10.0 | .952 |
| infinity | 1.0 |

For the most commonly used buses, $R_O$ is in the range of approximately 100 ohms. If a transmitter's source impedance is made to be a 1000 ohms, the ratio $R_T/R_O$ is 10, and the ratio $V_B/V_A$ is 0.952 or relatively close to the desired ratio of 1.0. Therefore, merely increasing $R_T$ in a typical case to a 1000 ohms substantially eliminates the nibble effect.

Figure 3:
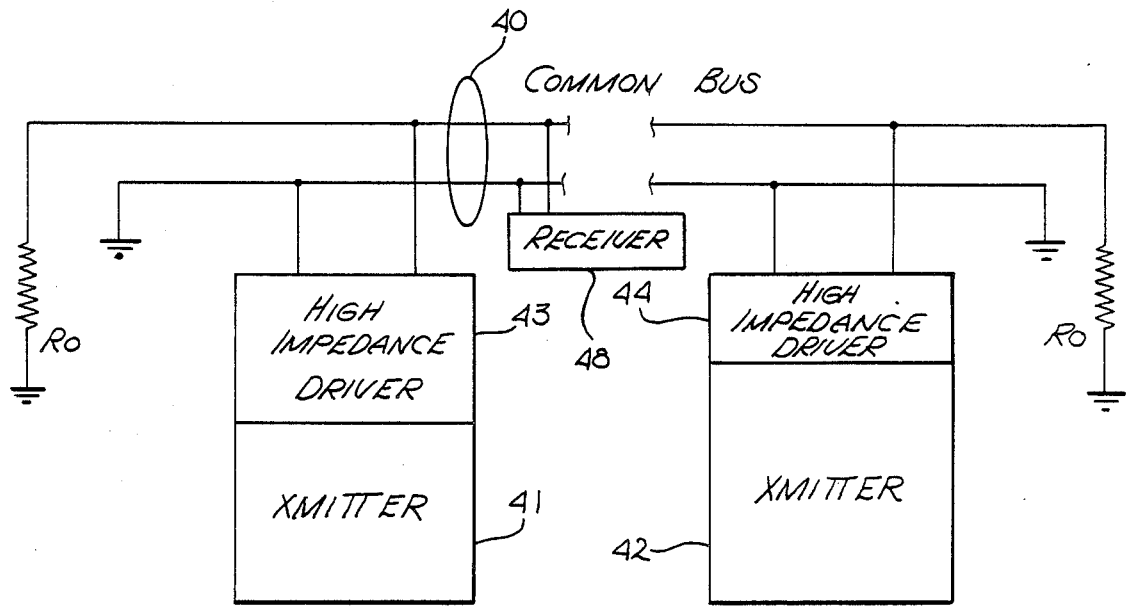
FIG. 3 illustrates a bus apparatus in accordance with the present invention where high impedance drivers are used.

In FIG. 3, a bus 40 is shown which may be identical to bus 30 of FIG. 2. Again, the ends of the bus are terminated in resistors which each have a value equal to the characteristic impedance of the bus, $R_O$. Two transmitters 41 and 42 are illustrated coupled to the bus. Transmitter 41 drives its signal onto the bus through a hig impedance driver 43. Many circuits are well-known in the art which provide high impedance outputs. Perhaps one of the most well known is a current source driver (in effect, a constant current source).

When the transmitters are not transmitting, they of course must present a high impedance to the bus as currently occurs even for TTL drivers which are typically "tristated". Also receivers coupled to the bus must present a high impedance to the bus.

The prior art TTL driver with their low impedance prevent the second transmitted signal from being placed on the bus. The high impedance drivers cause the second transmitted signal to be superimposed on the first signal. Then the second transmitted signal will propagate, for instance, in the case of FIG. 3 to the left of transmitter 42 and can be received by receiver 48 assuming this transmitter has receiving capability.

The invention is particularly useful in cases where the propagation time along the bus is of the same size as the timing margins. See copending application Ser. No. 613 026, filed May 22, 1984 which describes the use of the present invention in an improved branch exchange.

Thus, an improved bus apparatus and method for preventing interference on a bus having a plurality of transmitters has been described.

I claim:

1. In an electrical bus apparatus which includes a bus having a characteristic impedance and at least two transmitters coupled onto said bus for transmitting signals on said bus, a method for improving the performance of said bus where a propagation time along said bus between any two of said transmitters is significant compared to a period of transmission cycles used by said transmitters, comprising the steps of:

providing high impedance current drivers between said transmitters and said bus to drive time division multiplexed signals transmitted from said transmitters;

transmitting a first of said time division multiplexed signals onto said bus from a first of said transmitters;

transmitting a second of said time division multiplexed signals onto said bus from a second of said transmitters, while said first signal is still on said bus;

inhibiting signal loss on said bus when both said first and second signals collide on said bus.

2. A method for preventing signal loss on a bus which has a characteristic impedance $R_O$ and at least two transmitters coupled to said bus and where a propagation along said bus between said two transmitters is significant compared to a period of transmission cycles, comprising the steps of:

providing current drivers for said transmitters to drive time division multiplexed signals onto said bus, said current drivers presenting an impedance to said bus while driving signals onto said bus which is substantially greater than $R_O$, transmitting a first of said time division multiplexed signals onto said bus from a first of said two transmitters;

transmitting a second of said time division multiplexed signals onto said bus from a second of said two transmitters, while said first signal is still present on said bus;

minimizing signal loss on said bus when both said first and second signals collide on said bus by having said impedance substantially greater than $R_O$.

3. The method defined by claim 2 further including the step of providing said impedance of said drivers at greater than ten times said characteristic impedance $R_O$.

4. In an apparatus employing a bus having a characteristic impedance $R_O$ and a plurality of transmitters coupled to said bus, an improvement in said apparatus comprising:

a plurality of high impedance current drivers, each coupled to said bus and to its respective transmitters, for driving time division multiplexed signals from said transmitters onto said bus;

wherein a first of said plurality of transmitters transmitting a first of said time division multiplexed signals onto said bus through its respective current drivers; and wherein a second of said plurality of transmitters transmitting a second of said time division multiplexed signals onto said bus through its respective current driver, such that impedance of said high impedance current driver is sufficiently greater than said characteristic impedance $R_O$ to minimize signal loss during periods when multiple signals collide on said bus.

5. The improvement defined by claim 4 wherein said impedance of said current drivers during transmission is greater than ten times $R_O$.

* * * * *

UNITED STATES PATENT AND TRADEMARK OFFICE
CERTIFICATE OF CORRECTION

PATENT NO. : 4,803,699

DATED : 02-07-89

INVENTOR(S) : Graham

It is certified that error appears in the above-identified patent and that said Letters Patent is hereby corrected as shown below:

| Column | Line | |
|---|---|---|
| 4 | 30 | delete "$V_B/V_B$", insert --$V_B/V_A$-- |
| 4 | 50-51 | delete "elminates", insert --eliminates-- |
| 4 | 58 | delete "hig", insert --high-- |

Signed and Sealed this

Twentieth Day of March, 1990

Attest:

JEFFREY M. SAMUELS

Attesting Officer

Acting Commissioner of Patents and Trademarks